United States Patent [19]
Durham

[11] Patent Number: 5,305,654
[45] Date of Patent: Apr. 26, 1994

[54] HEADSET FOR BICYCLES WITH EXTERNAL FORKS

[76] Inventor: Roger O. Durham, 1370 Thompson Ave., Glendale, Calif. 91201

[21] Appl. No.: 72,108

[22] Filed: Jun. 7, 1993

[51] Int. Cl.⁵ ............................................. B62K 21/12
[52] U.S. Cl. .................................. 74/551.1; 280/279
[58] Field of Search .......................... 74/551.1–551.8; 280/279, 280

[56] References Cited

U.S. PATENT DOCUMENTS

| | | | |
|---|---|---|---|
| 368,360 | 8/1887 | Trigwell | 280/279 |
| 3,295,863 | 1/1967 | Jaulmes | 280/279 |
| 4,410,197 | 10/1983 | St. Hillaire | 74/551.1 X |
| 4,600,207 | 7/1986 | Zosi | 280/279 |

FOREIGN PATENT DOCUMENTS

| | | | |
|---|---|---|---|
| 501147 | 2/1951 | Belgium | 280/279 |
| 552485 | 5/1923 | France | 74/551.1 |
| 3-235775 | 10/1991 | Japan | 280/279 |
| 83114 | 9/1956 | Netherlands | 280/279 |
| 209921 | 1/1924 | United Kingdom | 74/551.1 |
| 570439 | 7/1945 | United Kingdom | 280/279 |

Primary Examiner—Vinh T. Luong

[57] ABSTRACT

A headset for bicycle having external forks. The headset allows the use of small standard sealed radial ball bearings, and allows for easy fork replacement by removing and replacing only two screws. Ball bearings with outer and inner races are inserted into bearing bores of the head tube of a bicycle frame. A pair of internally threaded bushings insert through the bearing inner races and are drawn together by a stud. Fasteners, such as screws, insert through mounting holes in spaced-apart mounting brackets of the external forks and engage the two bushings to secure the forks to the headset.

2 Claims, 1 Drawing Sheet

HEADSET FOR BICYCLES WITH EXTERNAL FORKS

BACKGROUND OF THE INVENTION

1. Field of the Invention

This invention pertains to headsets for bicycles having external forks.

2. Description of the Prior Art

In the past, bicycles had internal forks in which the steering tube of the forks extended through bearings inserted into the head tube of the bicycle frame. This arrangement has several disadvantages:

1. The relatively large diameter of the steering tube mandated headset bearings with unduly large inside diameters. The use of adequate sealed radial ball bearings, which would have had much smaller inside diameters, was precluded by the size of the steering tube of the forks. (A radial ball bearing having an inside diameter of about ½ inch has adequate carrying capacity for a headset bearing . . . steering tubes have usually been 1" in diameter).

2. In the past, installation, adjustment, and removal of headset bearings, forks, and stems has been unduly complicated. There were too many close-fitting components.

SUMMARY OF THE INVENTION

According to the invention, a simplified headset for bicycles having external forks includes;

a) a pair of ball bearings with outer and inner races which are inserted into opposite bearing bores of a bicycle head tube;

b) a pair of internally-threaded bushings which insert through the bearing inner races;

c) a threaded stud inside the head tube, which extends between the bushings to draw the bushings together;

d) fastener means, such as screws, which are inserted through mounting holes in mounting brackets secured to the steering tube of a set of external forks. The screws thread into the bushings. Tightening the screws while holding the respective bushings completes the installation.

The arrangement has several advantages:

1. Small standard sealed radial ball bearings can be used.

2. Only two screws need to be removed to remove the entire external forks, making fork replacement very easy.

3. There are no cones to adjust.

4. The hardware needed is simple and inexpensive to make. The bushings are made on an automatic screw machine.

Thus, the invention has the following objects:

1. to allow the use of sealed radial ball bearings of small size in a bicycle headset.

2. to mount external forks to the headset using simple hardware.

3. To allow easy fork replacement by removing and replacing two screws.

DETAILED DESCRIPTION OF THE DRAWINGS

Figure 2:
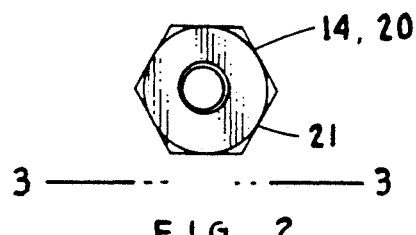
In FIG. 2 is shown a bushing by itself, in plan view.

Referring to the drawings, a bicycle external forks 1 includes a steering tube 2, a pair of spaced-apart forks 3, a lower mounting bracket 4 having a mounting hole 18, an upper mounting bracket 5 having a mounting hole 19, and a rectangular, forwardly-inclined handlebar post 16.

A bicycle frame 6 includes a head tube 7, a top tube 8, and a down tube 9. The head tube 7 includes a pair of oppositely disposed bearing bores 10 and 11 into which an upper ball bearing 12 and a lower ball bearing 13 are inserted. Said ball bearings 12 and 13 have inner races and outer races.

An upper bushing 14 inserts through the inner race of said upper ball bearing 12, and a lower bushing 20 inserts through the inner race of said lower ball bearing 13. Said bushings 14 and 20 are internally threaded to receive a threaded stud 15, by which means said bushings 14 and 20 are drawn lightly together.

A pair of fastener means 17, such as screws, insert through the mounting holes 18 and 19 of said mounting brackets 4 and 5, and engage said bushings 14 and 20. Tightening said fastener means 17 while holding bushings 14 or 20 completes the installation.

Figure 3:
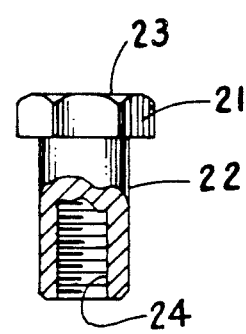
FIG. 3 is a partial section of the bushing shown in FIG. 2, taken along a line 3—3 of FIG. 2.
Figure 1:
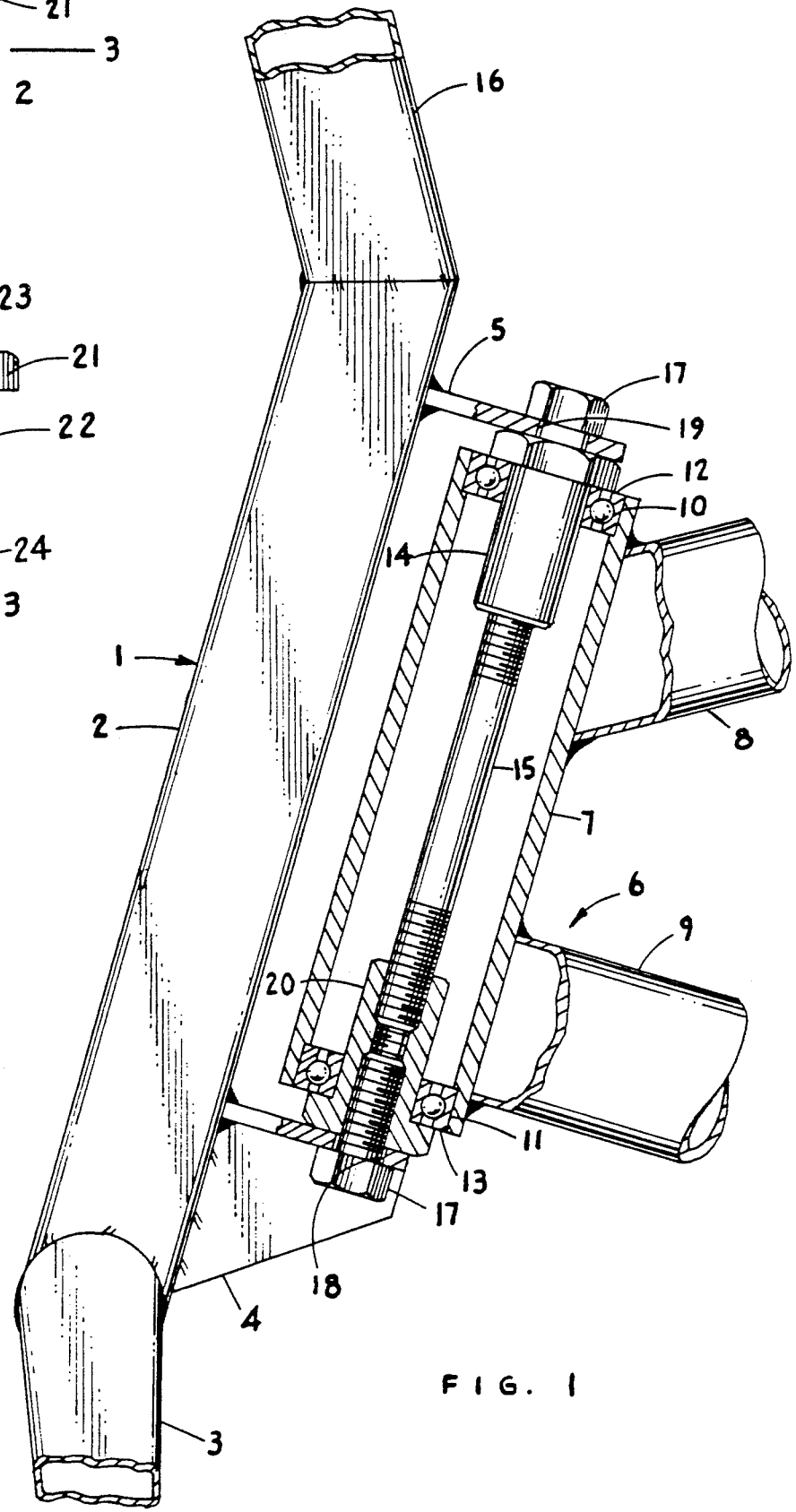
FIG. 1 shows a partial side view bicycle having external forks and a headset according to the invention. Part of the frame is shown and part of the external forks are shown.

Said bushings 14 and 20 are shown in FIGS. 2 and 3 to include a head 23 with a plurality of flats 21, a cylindrical portion 22, and an internally-threaded central hole 24.

MODE OF OPERATION

After said ball bearings 12 and 13 are pressed into said bores 10 and 11, said bushing 14 is inserted through the inner race of said upper ball bearing 12. Said stud 15 is threaded part way into said bushing 20 and is either secured by welding or by using a thread-locking fluid. Then said stud 15 and said bushing 20 are inserted through the inner race of of said lower ball bearing 13. The upper end of said stud 15 engages and threads into said bushing 14. The two bushings are drawn together until snug, then they are backed off slightly to preclude end-loading of said ball bearings 12 and 13. Fastener means 17 are inserted through said mounting hole 19 of said mounting bracket 5 and through said mounting hole 18 of said mounting bracket 4. The bushings 14 or 20 are held as the fastener means 17 are tightened, thus completing the installation.

Where stud 15 is shown to be a separate piece, it could be made integral with either of the two bushings 14 or 20.

Said mounting bracket 4, which is gussetted, is intended to resist all end loads. Said mounting bracket 5 is somewhat flexible, like a hinge, to accomodate the significant tolerance build-up between the top of bushing 14 and the bottom of bushing 20.

Without the stud 15 to hold fittings 14 and 20 together, a sudden downward force on external forks 1 could bend bracket 5 and dislodge the lower bearing 13, destroying the integrity of the headset and causing sudden loss of control. In prototype production, without such a stud 15, this happened.

Thus, the primary function of the stud 15 is to prevent mounting bracket 5 from flexing like a hinge, and to prevent sudden disassembly of the headset. The stud 15 is not intended to be used for bearing adjustment.

I claim:

1. In a bicycle having external forks including a pair of spaced-apart mounting brackets mounted on a steering tube, said mounting brackets including mounting holes, and a head tube having oppositely-disposed shouldered bearing bores at its ends, a headset comprising;

a) a pair of ball bearing including inner and outer races, said outer races inserted in said bearing bores of said bicycle frame head tube;

b) a pair of internally-threaded, shouldered bushings including head portions and cylindrical portions for engagement with the inner races of said ball bearings;

c) a threaded stud engaging said internal threads of said bushings;

d) a pair of fastener means inserted through said mounting holes in said mounting brackets of said external forks, said screws engaging said internal threads of said bushings.

2. Apparatus according to claim 1, wherein one of said bushings and said stud are integral.

* * * * *